United States Patent [19]

Murphy

[11] 4,423,671

[45] Jan. 3, 1984

[54] FLOATING KNIFE ASSEMBLY FOR A MEAT DEFATTING MACHINE WITH POSITIVE BLADE POSITION

[76] Inventor: Robert P. Murphy, 1807 Commercial St., Joseph, Mo. 64503

[21] Appl. No.: 491,938

[22] Filed: May 5, 1983

Related U.S. Application Data

[63] Continuation-in-part of Ser. No. 281,006, Jul. 6, 1981, Pat. No. 4,393,761.

[51] Int. Cl.³ .............................................. A22C 17/12
[52] U.S. Cl. ....................................... 99/486; 83/870; 83/874; 99/589; 99/590
[58] Field of Search ................. 99/485, 486, 537, 538, 99/539, 540, 584, 489–492, 588–591; 83/870, 871, 873, 874; 17/1, 21, 62

[56] References Cited

U.S. PATENT DOCUMENTS

| | | | |
|---|---|---|---|
| 3,249,139 | 5/1966 | Runnells, Jr. et al. | 99/589 |
| 3,504,721 | 4/1970 | Townsend | 99/589 |
| 3,559,707 | 2/1971 | Townsend | 99/589 |
| 3,844,207 | 10/1974 | Townsend | 99/589 |
| 4,123,959 | 11/1978 | Schill | 99/589 X |
| 4,188,870 | 2/1980 | Schill | 99/589 |
| 4,246,837 | 1/1981 | Chenery | 99/486 X |
| 4,292,710 | 10/1981 | Townsend | 99/589 X |

*Primary Examiner*—Timothy F. Simone
*Attorney, Agent, or Firm*—Litman, Day & McMahon

[57] ABSTRACT

A floating knife assembly with positive blade positioning for use with a meat defatting machine to trim a portion of a layer of fat from a piece of meat while leaving a desired thickness of fat layer thereon.

The knife assembly includes a gauge plate which engages the piece of meat, riding on an upper surface thereof as the meat is urged toward the knife. The gauge plate and knife are interconnected by a linkage system comprising a gauge plate position sensor and a power ram which urges the knife to a desired position relative to the piece of meat dependent upon the position of the gauge plate. The knife is securely locked into position as an individual piece of meat is urged therepast assuring that a constant thickness of fat is retained on the meat.

6 Claims, 14 Drawing Figures

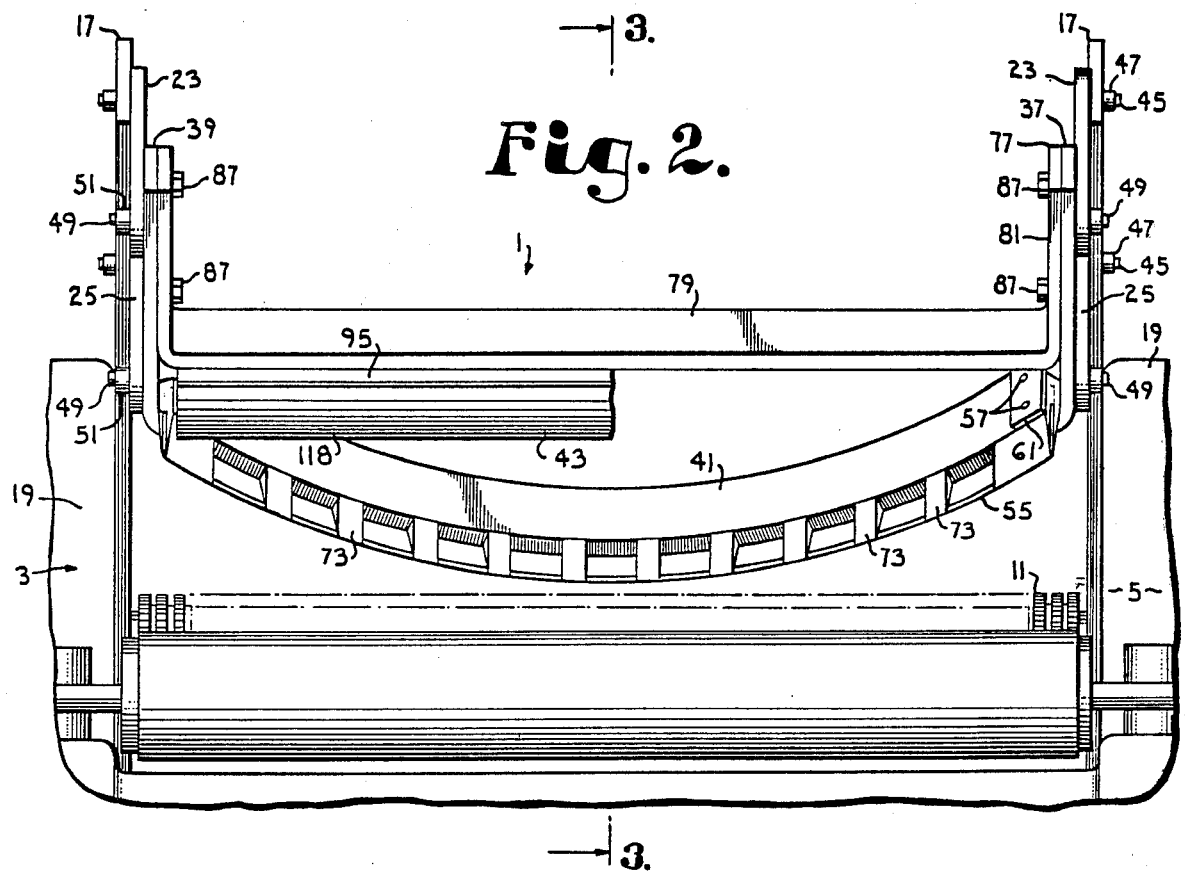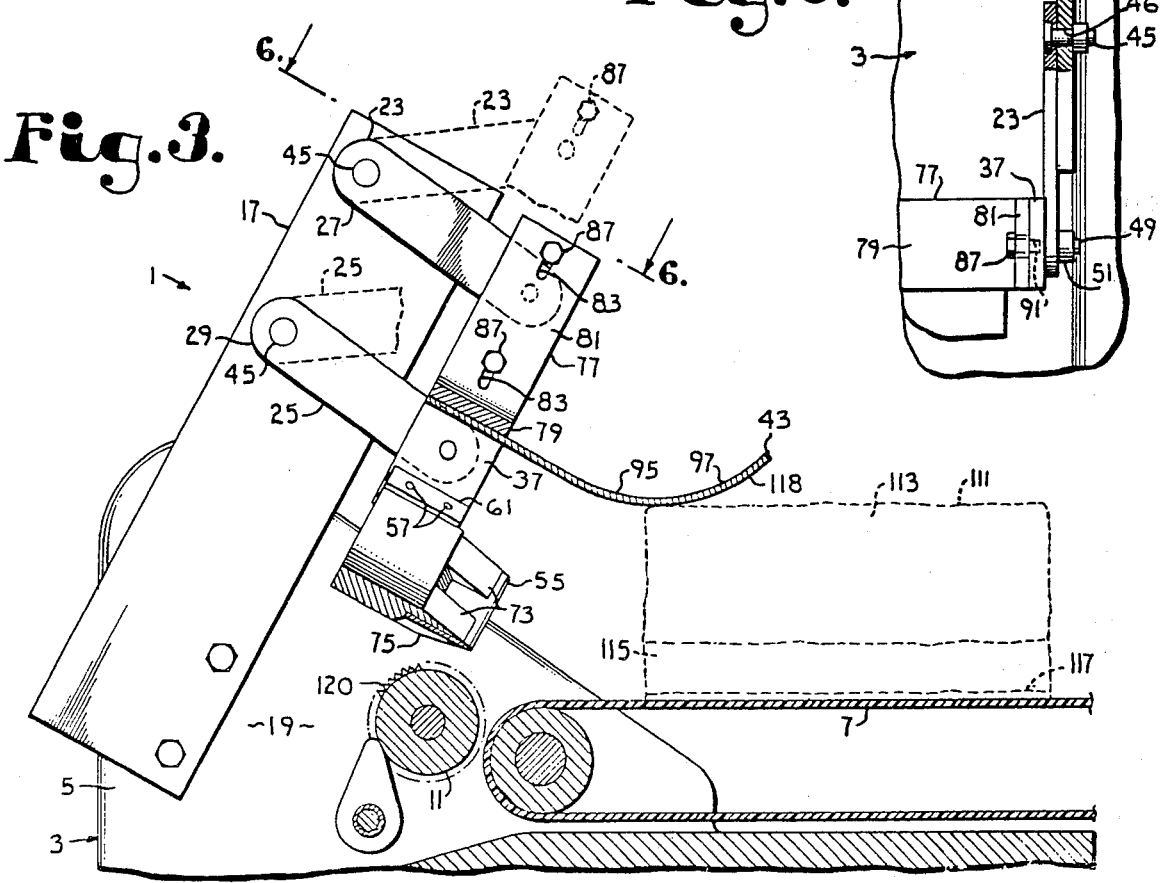

FLOATING KNIFE ASSEMBLY FOR A MEAT DEFATTING MACHINE WITH POSITIVE BLADE POSITION

CROSS-REFERENCE TO RELATED APPLICATION

This application is a continuation-in-part of U.S. Pat. application Ser. No. 281,006, filed July 6, 1981, entitled Floating Knife Assembly For a Meat Defatting Machine, now U.S. Pat. No. 4,393,761.

BACKGROUND OF THE INVENTION

This invention relates to meat defatting machines in general and in particular, to such machines which include thereon, a floatable defatting knife.

In the meat packing industry defatting machines are used which include a defatting knife to trim an excess portion of a fat layer from a large piece of meat such as a shoulder ham (Boston Butt) or the like prior to selling the resulting meat product to a customer. Some of these machines also incorporate a deskinning knife which allows an outer skin layer attached to the fat to be removed while simultaneously removing the excess portion of the fat layer.

In most instances, the meat packing company leaves a certain thickness of fat layer on the resulting meat product. The thickness of the fat layer so remaining is subject to an agreement between the meat packing company and its customers. Usually penalties are involved if the meat packer furnishes meat which has a fat layer thickness which exceeds the specified acceptable amount. Further, it is economically desirable to assure that the remaining fat layer cover as close as possible to or equals the acceptable thickness. Therefore, it is desirous when trimming portions of the fat layer from each piece of meat to leave the desired thickness of fat layer on the meat in the most exact manner possible.

It has been found that butchered animals such as hogs or cows that are of the same age group generally exhibit, on each particular cut of meat therefrom, a red meat thickness that is generally constant for the age group of animal. However, the thickness of the fat layer in a given age group can vary depending upon the nature of the feed the particular animal was fed. For example, corn fed animals will display a thicker fat layer than other animals of the same age group which were raised on milo or other feed rations.

The typical meat defatting machine will include a conveyor or the like which will rapidly present to a defatting knife successive cuts of meat. These successive cuts of meat typically are from animals of the same age group but as stated, do not have a constant thickness of fat layer although they do have a generally consistant thickness of red meat layer. Further, these successive pieces of meat are presented to the defatting knife in an orientation wherein the fat layer is resting on a conveyor with the red meat layer facing upwardly.

Typical examples of the prior art have shown machines which have manually adjustable defatting knives wherein an operator of the defatting machine will observe a piece of meat as it approaches the defatting knife, noting the thickness of the fat layer thereon, and attempt to manually adjust the height that the defatting knife is positioned above the conveyor surface to leave a constant thickness of fat layer on each successive piece of meat.

Because of the rapid speed in which the pieces of meat are conveyed to the defatting machine, it is impossible for an operator to continually and accurately adjust the defatting knife for each successive piece of meat.

The device originally disclosed in the parent of the present application was successful in automatically positioning the knife blade such that it engaged each successive piece of meat as it was urged therepast at a proper position relative to the lean meat-fat juncture. However, it has been found that the blade has a tendency to continue to float relative to the piece of meat after engaging the latter causing an unevenness in the layer of fat remaining of the lean meat.

SUMMARY OF THE INVENTION

In a first embodiment of the present invention a floatable defatting knife assembly is provided to be used in conjunction with a meat defatting machine. The floatable knife assembly includes support brackets for the knife, a linkage system, and a knife and gauge plate mounted on the linkage system. The gauge plate is mounted above the knife and the distance between the gauge plate and the knife is selectively adjustable for use with cuts of meat having varying red meat thicknesses and for leaving a desired thickness of a fat layer on the red meat. The knife assembly is mounted on a defatting machine which includes a conveyor to convey the pieces of meat toward the defatting knife and a gripper roller having longitudinal teeth or serrations thereon which engages the piece of meat propelling it past the defatting knife.

When a piece of meat approaches the defatting knife on the conveyor, it will engage a bottom surface of the gauge plate forcing the gauge plate and floatable knife upwardly a certain vertical distance depending upon the total thickness of the piece of meat. The distance between the gauge plate and the knife itself has been adjusted to equal the thickness of the red meat portion of the piece of meat and the allowable thickness of the fat layer portion to be left on the meat. As the meat is urged by the gripping roller past a knife blade, a portion of the fat layer is separated from the piece of meat leaving the desired thickness of fat layer on the red meat. After the piece of meat progresses past the knife assembly, gravity will urge the knife assembly downwardly in position to engage the next piece of meat.

In a second embodiment of the invention as set forth herein, the floating knife assembly has a positive blade lock means to lock the knife blade in position relative to a conveyor moving the meat during the period each successive piece of meat is being cut thereby assuring that a consistant layer of fat remains attached to each successive piece of meat across the entire piece of meat provided a gauge plate associated therewith does not move substantially.

The floating knife assembly in the second embodiment includes the gauge plate pivotally supported at a front end thereof above a conveyor means by support stands. A rear edge of the gauge plate engages and rides on a top surface of the successive pieces of meat. The guage plate rear edge has a link attached thereto which includes a position indicator incorporated therewith.

A knife blade is attached to the housing above the conveyor at a position generally adjacent a gripping roller by opposed support members which pivot about an axis normal to the motion of meat past the knife blade. The support members are attached to the housing at a point spaced from the point of attachment of the knife blade to the support members. The position of the knife blade relative to the conveyor is changed by pivoting the support members about the pivot point.

A two-way power ram is connected to the knife blade support means to provide the impetus to rotate the arms. When the support arms have been rotated to a desired position a valve controlling hydraulic fluid to the ram is closed prohibiting movement of the support arms and securely locking the knife blade in place.

A suitable hydraulic pump is provided to supply fluid to both ends of the power ram as is a flow selector valve which prevents flow from the ram when the knife blade is locked into place.

A blade positioning mechanism or linkage comprising a first portion associated with the gauge plate, the position indicator, and a second portion connected to the knife blade activates the hydraulic pump and selector valve to supply the proper amount of fluid to the ram to properly position the knife blade.

OBJECTS OF THE INVENTION

Therefore, the objects of the present invention are: to provide a floatable knife assembly to be used in conjunction with a meat defatting machine to trim portions of a layer of fat from successive pieces of meat each having a fat layer thereon of varying thickness while leaving a constant remaining thickness of fat layer thereon; to provide such a floatable knife assembly which includes support members attached to a conventional meat defatting machine, pivotal links mounted thereon, a defatting knife mounting bracket to mount the defatting knife to the links and a gauge plate mounted on the mounting bracket; to provide such a knife assembly which allows the defatting knife to float upwardly or downwardly automatically upon engaging each successive piece of meat; to provide such a floatable knife assembly which includes a gauge plate which is selectively adjustable relative to the knife such that pieces of meat having varying red meat thicknesses can be accommodated by a single knife assembly; to provide such a floatable knife assembly which includes a positive knife blade position lock to lock the knife blade at a desired position relative to each successive piece of meat; and to provide such a floatable knife assembly which is simple in design, easy to manufacture, capable of automatic actuation, durable in use and particularly well adapted for the intended usage thereof.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is a fragmentary enlarged front elevational view of the defatting machine and the floatable knife assembly with portions broken away to show details thereof.

FIG. 3 is a cross-sectional view of the defatting machine and floatable knife assembly taken generally along line 3—3 in FIG. 2.

FIG. 6 is an enlarged, fragmentary cross-sectional view taken generally along line 6—6 in FIG. 3 showing details of a floatable knife linkage system of the first embodiment of this invention.

DESCRIPTION OF THE PREFERRED EMBODIMENT

Figure 1:
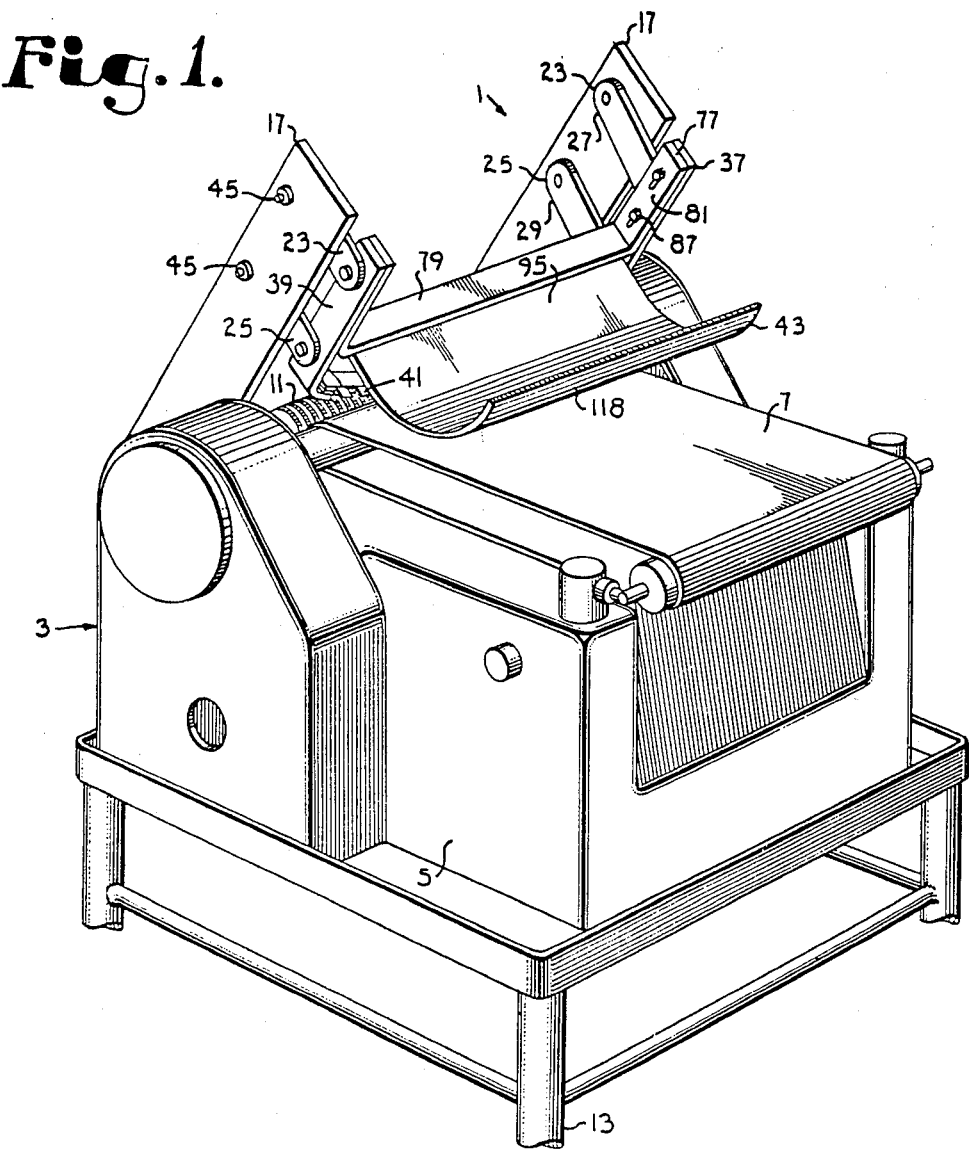
FIG. 1 is perspective view showing a meat defatting machine having attached thereto a first embodiment of a floatable knife assembly according to the present invention.
Figure 4:
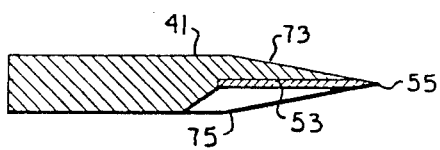
FIG. 4 is an enlarged cross-sectional view of a portion of a knife used in this invention.
Figure 5:
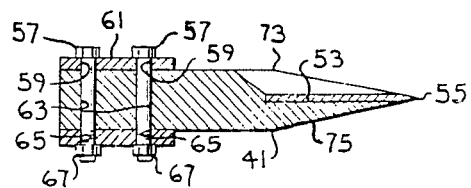
FIG. 5 is a second enlarged cross-sectional view of a different portion of the knife shown in FIG. 4.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a floating knife assembly according to the present invention shown mounted on a conventional meat product defatting machine 3.

The defatting machine 3 generally comprises a housing 5, a conveyor 7, a gripping roller 11 and a suitable support stand 13. Included with the defatting machine 3 is a motor means (not shown) such as an electric motor, to rotate both the conveyor 7 and the gripping roller 11.

The floatable knife assembly 1 includes spaced parallel and generally vertically oriented support members 17 which are rigidly attached by suitable fasteners to sides 19 of the defatting machine housing 5. As best seen in FIG. 2, the support members 17 substantially straddle the conveyor 7 and gripping roller 11. A pair of spaced parallel upper and lower links 23 and 25 respectively are pivotally attached at first ends thereof 27 and 29 respectively to each support member 17. At second ends 31 and 33 thereof respectively, the links 23 and 25 have pivotally attached thereto mounting plates 37 and 39. As best shown in FIG. 3, the mounting plates 37 and 39 are spaced from and substantially parallel with the associated support member 17 forming a parallelogram therewith.

Securely attached to a lower portion of mounting plates 37 and 39 and extending therebetween is a defatting knife blade holder 41. A gauge plate 43 is attached to and extends between the mounting plates 37 and 39 by means of a gauge plate support bracket 77 at a position generally above that of the knife holder 41. The gauge plate support bracket 77 is connected to the mounting 37 and 39 so as to be selectively adjustable therewith.

The links 23 and 25 include at their first ends 27 and 29 thereof, a shaft or axle 45 extending outwardly therefrom relative to a center of the defatting machine 3. The axles 45 are received through bores 46 in the support members 17. Collars 47 are provided which securely engage axles 45 to retain same within bores 46.

Extending outwardly from mounting plates 37 and 39, are shafts or axles 49 which likewise extend through bores (not shown) in links 23 and 25 and are received in collars 51 attached thereto so as to be retained in link bores (not shown). As such, the links 23 and 25 are rotable both around their points of attachment with the support members 17 and their points of attachment to the mounting plates 37 and 39. Further, the pivoting of the links 23 and 25 allow the knife holder 41 and gauge plate 43 to be positioned over a continuous range of positions relative to gripping roller 11. As shown in FIG. 3, the solid lines show a position of the knife holder near the lower end of the range of positions and the dotted lines show the position of the links when the knife holder is near the upper end of the range of positions.

The knife holder 41 includes a slot 53 therein in which is snugly retained a knife blade 55. The knife holder 41 is securely attached to the mounting plates 37 and 39 by means of bolts 57 extending through bores 59 in a cap plate 61, bores 63 in knife holder 41 and bores 65 in mounting plates 37 and 39 retaining the knife holder 41 onto the mounting plates 37 and 39. Suitable fasteners such as nuts 67 are used to retain the bolts 57 therein.

As best shown in FIG. 2, the knife holder 41 and blade 55 are curved upwardly near outer edges thereof. It is understood that knife holder 41 and blade 55 could be of any suitable design.

The forward portion of the knife holder 41 is beveled to exhibit a substantially wedge shaped configuration. Further, as shown in FIG. 2 the knife holder 41 includes land areas 73 and 75 alternatingly positioned both above and below the blade receiving slot 53.

Figure 7:
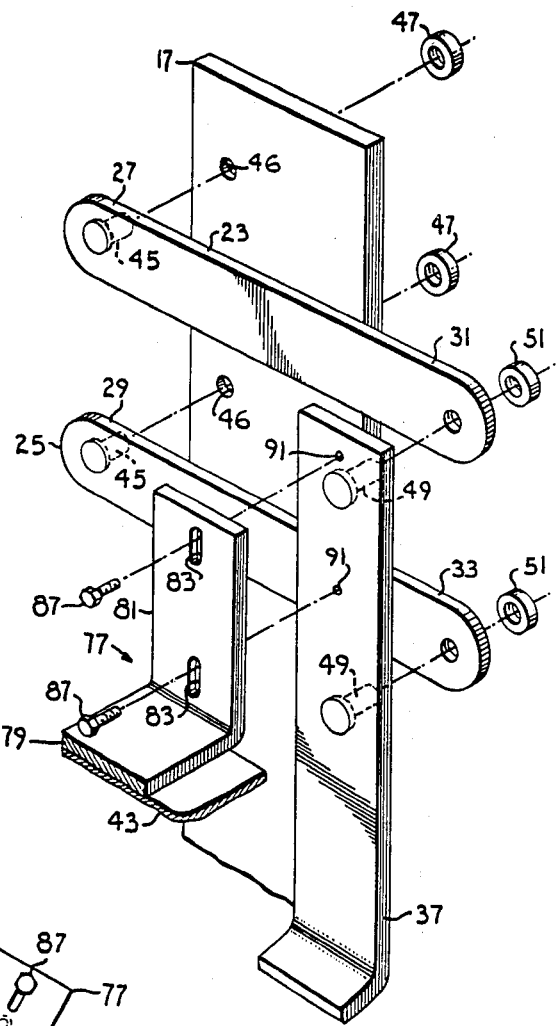
FIG. 7 is an enlarged fragmentary exploded perspective view of a portion of the first embodiment of the knife assembly.

The gauge plate support bracket 77 includes a substantially horizontal portion 79 extending between leg portions 81. The leg portions 81 abut against the mounting plates 37 and 39 and are adjustably retained therewith. As best shown in FIGS. 3 and 7, the leg portions 81 include substantially vertical slots 83. Bolts 87 extend therethrough and are received in threaded apertures 91 in mounting plates 37 and 39.

The gauge plate 43 comprises a substantially planar member having a straight portion 95 extending forwardly and downwardly from the gauge plate support bracket horizontal portion 79 and an upwardly curving forward tip portion 97.

In use, the floating knife assembly 1 is used in conjunction with the defatting machine 3 to separate a portion of a layer of fat of a piece of meat from a fat layer that is to remain on the resulting meat product. As shown in FIG. 3, successive pieces of meat 111 such as a butt are processed by the defatting machine 3. The pieces of meat 111 include thereon, a red meat portion 113, a fat layer 115 and a skin portion 117. It has been found that animals of the same age have in each individual cut of meat, a red meat layer 113 of constant thickness. However, animals of the same age group which are raised on different feed have a fat layer 115 which is of varying thickness depending on the feed used. As shown in FIG. 3, the pieces of meat 111 approach the knife assembly 1 in the orientation such that the red meat portion 113 is exposed upwardly and the fat layer and skin 115 and 117 are exposed downwardly, substantially in contact with a conveyor 7. In order to achieve a constant thickness of fat layer remaining on the red meat portion 113 of each piece of meat 111, the floatable knife 1 is continuously and automatically biased upwardly and downwardly over a continuous range of positions relative to the conveyor dependent on the total thickness of each successive piece of meat 111, which varies depending on the thickness of the associated fat layer 115.

As shown in FIG. 3, when a piece of meat 111 approaches the knife assembly 1, conveyed thereto by conveyor 7, the red meat portion 113 will engage a bottom surface 118 of the gauge plate tip portion 97, urging the gauge plate 43 upwardly causing the links 23 and 25 to rotate about their points of connection on support members 17 and mounting plates 37 and 39 thereby raising the knife blade 55. As the meat further progresses toward the knife blade 55, the gauge plate 43 rests on the top surface of the meat positioning the knife above the gripping roller 11. As the meat contacts the gripping roller 11, the meat 111 is engaged by longitudinal radially extending teeth or ridges 120 of the gripping roller and is rapidly urged past the knife blade 55.

It is seen that the distance between the gauge plate 43 and the knife blade 55 will determine the thickness of fat layer which is retained on the red meat portion of the meat 111. For example, if the particular cut of meat 111 which is being processed by the defatting machine 3 has a constant red meat layer thickness of three inches and it is desired to retain on successive pieces of meat a fat layer 115 of one-half inch thickness then the distance between the gauge plate 43 and the knife blade 55 is adjusted to be three and one-half inches. This is accomplished by loosening bolts 87 and 89 and adjusting the gauge plate support bracket 77 relative to the mounting brackets 37 and 39 such that the vertical distance between the gauge plate 43 and knife blade 57 is three and one-half inches.

After each piece of meat 111 has traversed past the knife assembly 1, gravity will automatically and quickly bias the links 23 and 25 gauge plate 43 and knife holder 41 downwardly such that the knife blade 55 assumes a position directly above the gripping roller 11. Stops (not shown) can be provided to stop the downward rotation of the links 23 and 25 at such a position. When a second piece of meat in succession contacts the gauge plate 43, the gauge plate will be biased upwardly thereby raising the knife blade 55. Since each successive piece of meat has a constant thickness of red meat portion 113, the floatable knife assembly 1 will trim that portion of fat layer 115 which is excessive of the desired amount that is to remain on the red meat portion 113.

Figure 8:
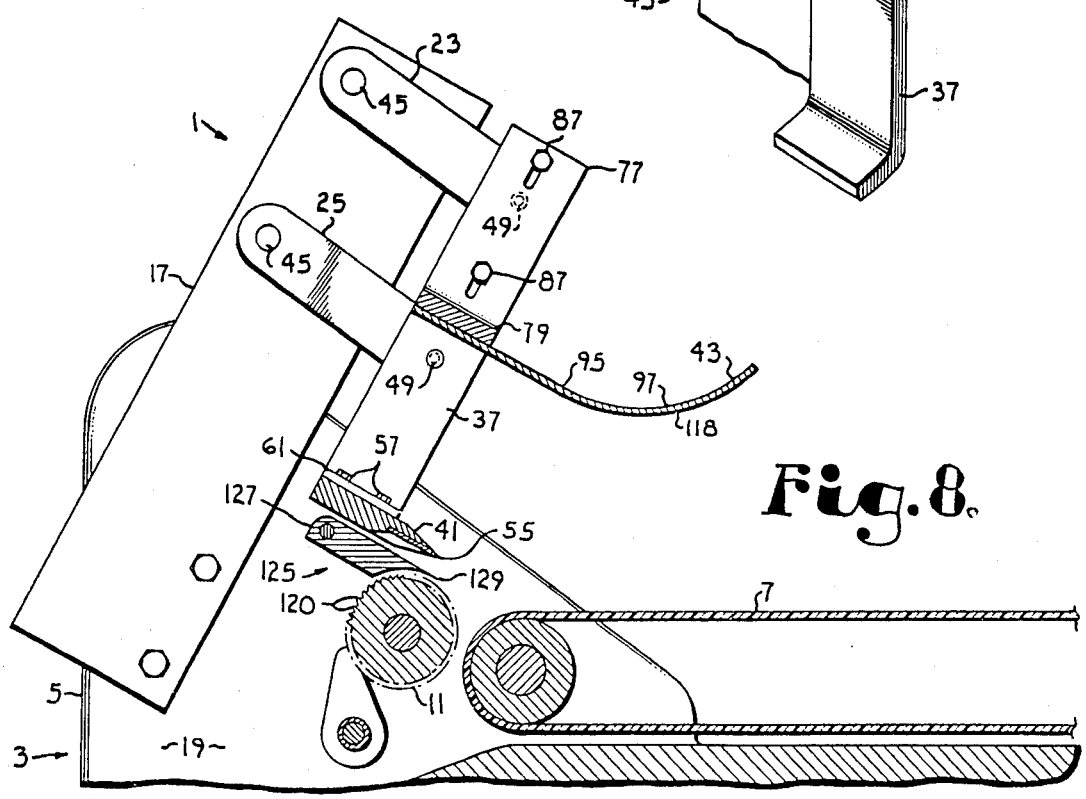
FIG. 8 is a cross-sectional view of the first embodiment of the knife assembly according to the present invention showing an alternate knife used therewith.

FIG. 8 shows the knife assembly 1, mounted on a defatting machine 3, with the knife holder 41 thereof being straight or flat. Further, a deskinning knife 125 is provided to separate the skin layer 117 from that portion of the fat layer 115 which is separated from the piece of meat 111 by the defatting blade 55. The deskinning knife 125 includes a holder 127 and a blade 129. The holder 127 is securely attached to the defatting machine housing 5 by suitable means so as to remain fixed relative to the gripper roller 11. The defatting knife holder 41 and gauge plate 43 function as set forth above and the deskinning knife 125 separates the skin layer 117 from the fat layer 115.

A second embodiment of a knife assembly according to the present invention is shown in FIGS. 9–14 and is generally designated by the reference numeral 151. With specific reference to FIGS. 9 and 10, the knife assembly 151 generally comprises a support housing 153 in and on which various components of the knife assembly 151 are attached. A first conveyor means or mechanism 155 is provided along with a gauge plate 157, a knife blade 159 and blade positioning means such as linkage mechanism 161 associated with and cooperating between both the gauge plate 157 and knife blade 159 to position the knife blade 159 at a desired vertical height or position above the conveyor mechanism 155 relative to a piece of meat as it is urged past the blade 159. A gripper roller 163 is provided, as in the first embodiment. A second driven conveyor means or mechanism 165 has a relatively rough surface and is supported above the knife blade 159 and rides on a top surface of the meat both urging the meat downwardly, assuring that it does not rise from a position on the conveyor, and providing impetus to the meat to urge the meat past the knife blade 159. The conveyor mechanism 165 includes suitable drive motor and drive linkage 166. A deskinning blade mechanism 169 is provided again as in the first embodiment to cut the skin from the successive pieces of meat if so desired.

A blade position locking means is provided for locking the knife blade 159 in a desired position once it engages a piece of meat of generally uniform thickness thereby assuring that a constant thickness of fat layer is retained along the entire length of a piece of meat and on the successive pieces of meat as they are urged past the knife blade 159, although it is possible to selectively adjust the thickness of the fat layer as will be discussed hereafter.

The gauge plate 157 is pivotally attached near a front edge 170 thereof to the housing 153 by suitable support members 171 positioned one on each side of the first conveyor mechanism 155. The gauge plate 157 is freely attached to the support members 171 so as to be freely pivotal relative thereto about a generally horizontal and laterally aligned axis which is generally parallel to the front edge 170 of the gauge plate 157. The successive pieces of meat 172 having a top surface 173 pass under the gauge plate 157 and between the support members 171.

Figure 11:
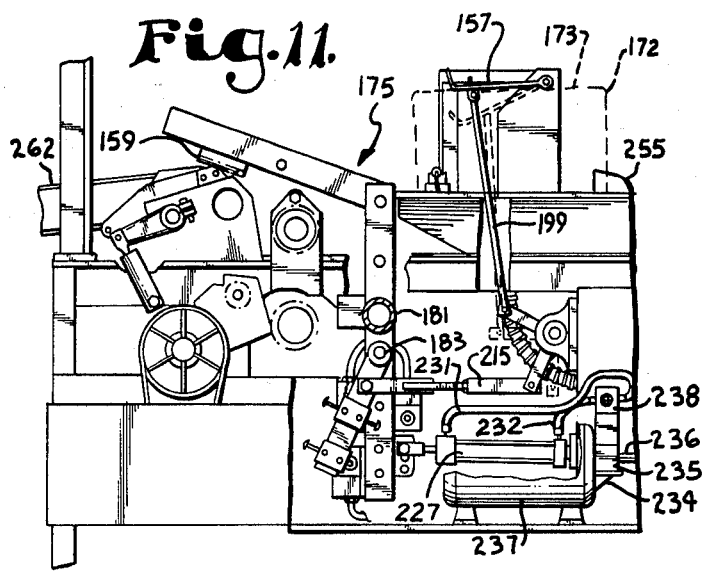
FIGS. 11 and 12 are enlarged fragmentary side elevational views of the second embodiment of the machine and knife assembly showing details of a knife positioning mechanism thereof.
Figure 12:
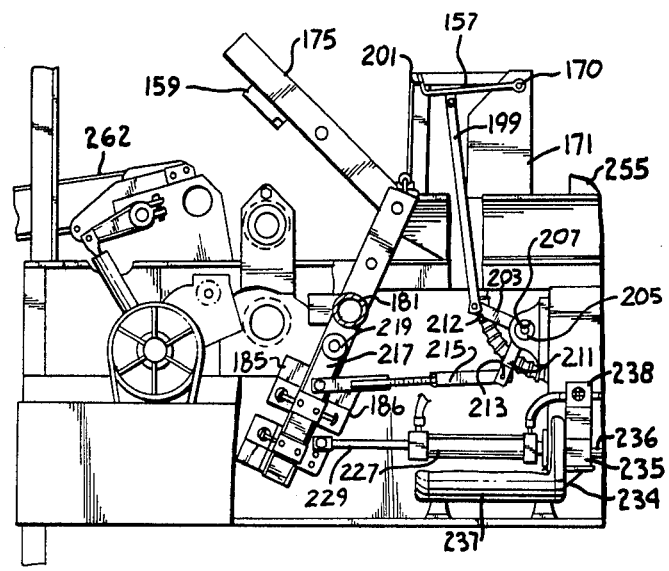
Figure 13:
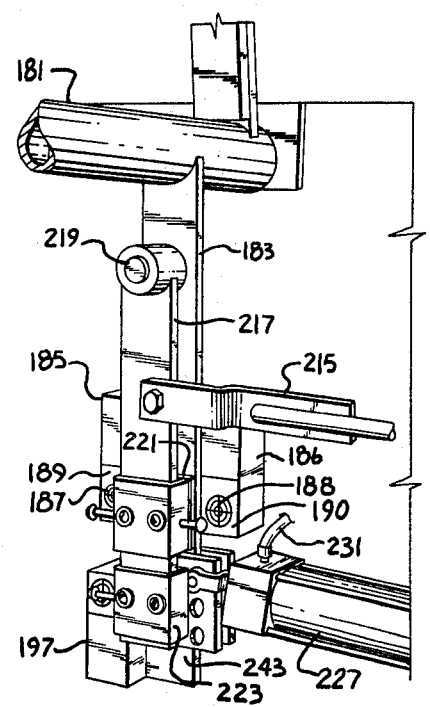
FIGS. 13 and 14 are fragmentary and enlarged perspective views of portions of the second embodiment showing further details of portions of the knife positioning mechanism thereof.

The knife blade 159 is supported on the housing 153 by a pair of knife blade support members 175 each being pivotally attached to an opposite side of a housing frame 179. As shown in FIGS. 11 and 12, the knife blade support members 175 pivot about a transverse axis relative to the first conveyor mechanism 155 which axis is associated with the rod 181 which extends between the knife blade support members 175 and is suitably journaled in opposite sides of the housing frame 179.

Depending downwardly from the transverse rod 181 preferably near one end thereof is an elongate leg 183 which functionally supports proximity switches thereon. Attached to the elongate leg 183 are first and second proximity switches 185 and 186 retained on opposite sides of the legs 183. The switches 185 and 186 each have a zone of influence area defined by a circle 187 and 188 on a front face 189 and 190 thereof respectively. Proximity switches are well known in the art and comprise electrical switches which are activated or turned-on when a suitable object is placed within the respective individual zone of influence.

Figure 9:
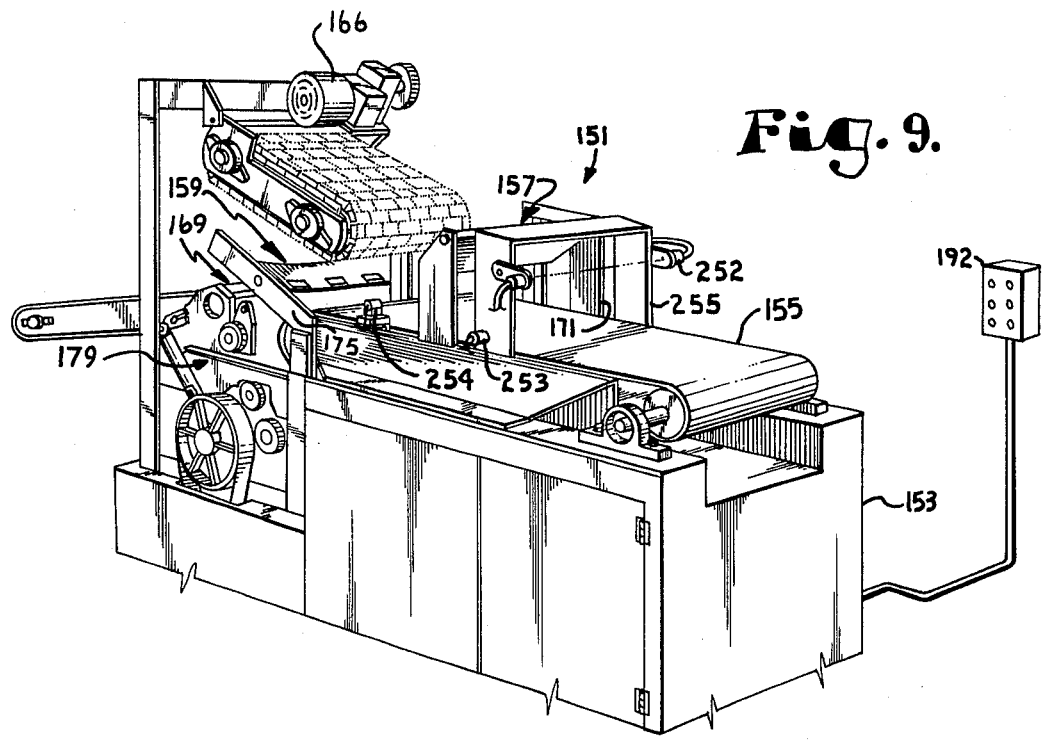
FIG. 9 is a perspective view of a second or modified embodiment of a knife assembly according to the present invention in conjunction with a meat defatting machine.
Figure 10:
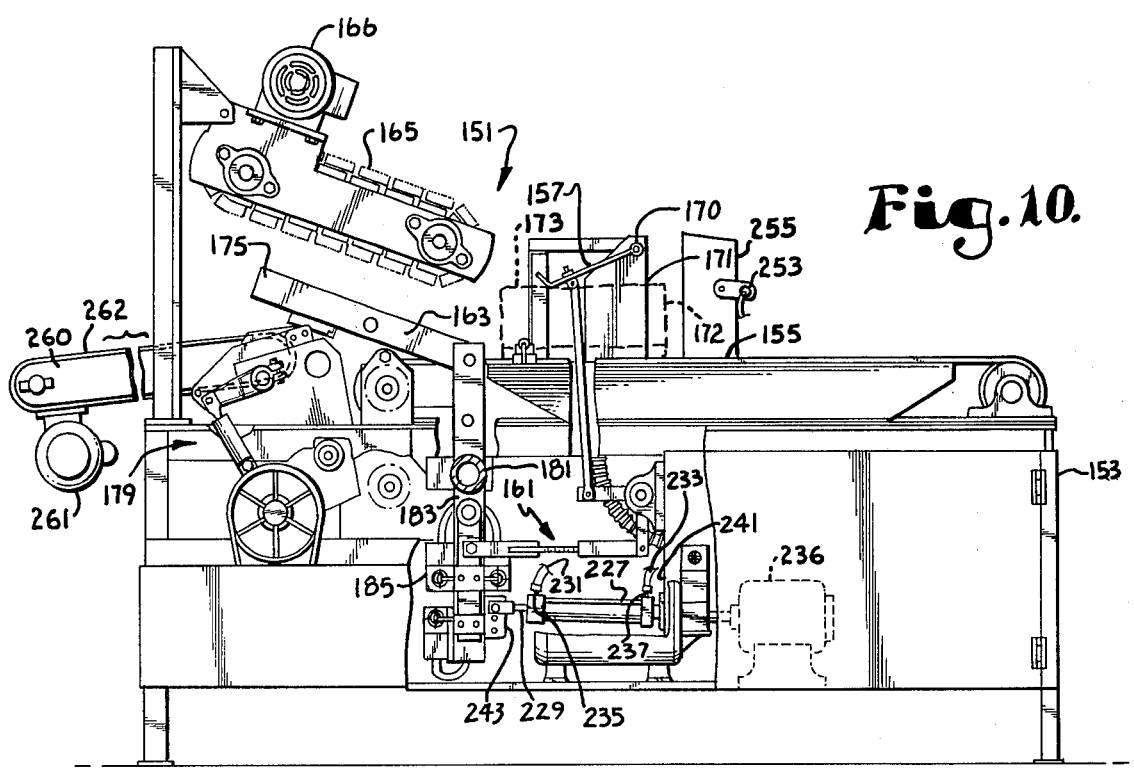
FIG. 10 is a side elevational view of the second embodiment of the machine and knife assembly of the present invention with portions of a housing thereof broken away to show details thereof.

The proximity switches 185 and 186 have suitable electrical conduits 191 associated therewith which electrically connect the switches to a central electrical control panel 192 which is shown in FIG. 9 as being remote from the remainder of the assembly 151 but which may be also mounted on the housing 153.

A third proximity switch 197, also having a zone of influence, is positioned below the first proximity switch 185 but is spaced slightly further outward from the elongate leg 183 than switch 185.

As best shown in FIGS. 11 and 12 the gauge plate 157 has a first link 199 pivotally connected to the plate 157 medially between a rear portion 201 and the plate front edge 170. The link 199 extends from the plate 157 to a first bell crank or lever 203 attached to a rocker shaft 205 which is transversely mounted in the housing by suitable journals 207 or the like and which has an axis of rotation aligned with or parallel to that of the gauge plate front edge 170.

A second bell crank 211 is attached to the rocker shaft 205 and is orientated normal to the first bell crank 203 such that when an end 212 of the first bell crank 211 connected to the link 199 is primarily urged upwardly or vertically, as when the gauge plate rear end 201 is urged upwardly upon contact with a piece of meat 172, end 213 of the second bell crank 211, which end 213 is spaced outward from the shaft 205, is primarily urged horizontally.

A connecting link 215 of adjustable length is attached to the second bell crank end 213 and extends between the second bell crank end 213 and a gauge plate position indicator support member 217. The gauge plate position indicator support member 217 is supported by and is pivotally attached to the elongate leg 183 by a suitable rod or pin 219, see FIG. 13, and has first and second indicator plates 221 and 223 securely attached thereto. The indicator plates are fabricated of a suitable material which will trigger the proximity switches 185, 186 and 197 when positioned in the zone of influence associated with each of the respective switches. Further, the first indicator plate 221 is positioned so as to be alignable with the first and second proximity switches 185 and 186 and the second indicator plate 223 is positioned so as to be alignable with the third proximity locator switch 197 as the position indicator support member 217 pivots about pin 219.

A suitable power means is provided to rotate the knife blade members 175, thus selectively positioning the knife blade 159. As shown herein, the power means is a hydraulic ram device which comprises a cylinder 227 and a plunger 229 attached to a piston (not shown) which reciprocates within the cylinder 227. Suitable fluid supply lines 231 and 233 are connected to suitable ports allowing flow of hydraulic fluid to the interior of the cylinder 227 and positioned on opposed sides of the piston so as to provide a source of fluid to the cylinder 227 from a suitable hydraulic system 234 (see FIG. 11) as is well known in the art. The hydraulic system 234 comprises a pump 235 with drive motor 236 and a fluid reservoir 237 and further has a three way selector switch or valve 238 (preferably a solenoid switch) associated therewith which allows the pump 235 to motivate pressurized fluid selectively to one of the two opposite sides of the cylinder 227 through lines 231 or 233 to urge the plunger 229 in a desired direction. The selector valve 238 further includes a third position wherein flow is prevented through either line 231 or 233 to effectively lock the plunger 229 in a particular position while fluid simply returns to the reservoir 237 from the pump 235 so as to bypass the cylinder 227.

Figure 14:
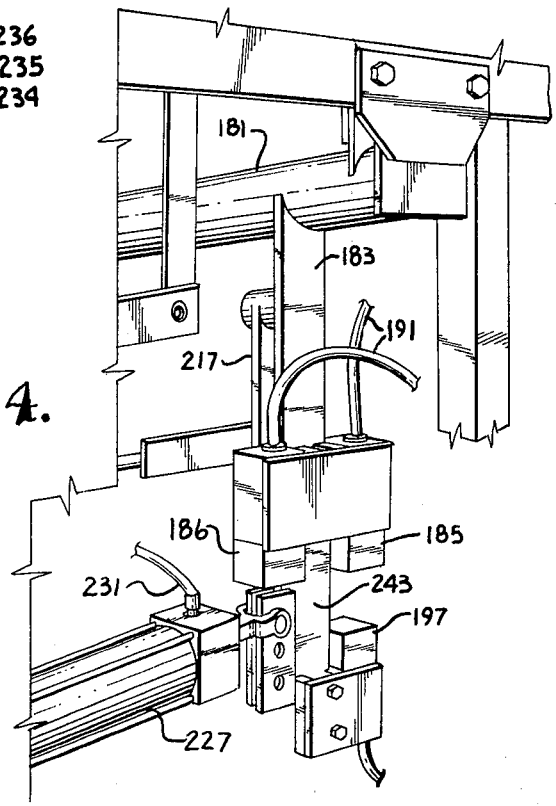

The ram cylinder 227 is mounted on a suitable framework 241 associated with the housing 153 and the plunger 229 is connected to a lower end 243 of the elongate leg 183 as best shown in FIG. 14.

The assembly 151 also includes an electric eye system comprising photo electric cells or eyes 252, 253 and 254. The eye 252 is adjustably mounted in a framework 255 above the conveyor belt 155 and just prior to the gate 157. The eye 253 is mounted below the eye 252 on the framework 255. A third eye 254 is mounted such that the beam thereof crosses over the belt 155 between the gate 157 and the blade 159.

A product discharge conveyor 260 is also provided for conveying meat products away from the blade 159. The conveyor 260 is mounted such that a belt 262 driven by a motor 261 engages the meat as it passes the blade 159 so as to convey the meat from the assembly 151.

It is noted that the various, electrical and hydraulic components are tied together by well known circuitry at electrical control panel 192 to allow coordinated control of the assembly 1. The panel 192 includes standard switches for starting the various conveyor motors, hydraulic motor 236 and deskinning blade motor. The panel 192 also includes a switch for allowing manual selection of whether the blade 159 will be set for premium or regular cuts by activating one of proximity switches either 185 or 197.

This selection process can also be placed in an automatic mode wherein photo electric cells 252 and 253 control the grade adjustment. For example, if premium grade is desired, the meat is normally trimmed for this grade unless a large pork butt breaks the beam of cell 252. When this occurs, the circuitry automatically switches to regular grade and activates the proper proximity switch. When cell 252 is triggered, there is a relay which maintains the system in the regular grade setting until the normal time has elapsed for the particular butt that triggered cell 252 to pass. Cell 253 is spaced horizontally along the conveyor 155 from cell 252 and, when triggered, acts to disable the signal from cell 252 such that if the butt does not immediately trigger cell 252, it will not do so as the butt continues through gate 157. Cell 254, when triggered, sets the hydraulic valve 238 on bypass such that the cylinder plunger 229 and consequently the blade 159 are locked in position as the butt 172 engages the blade 159. A time delay relay holds the blade 159 in the locked position until a normal time has passed for the butt 172 to be entirely trimmed by the blade 159 after which the blade 159 is free to be set in position for the next successive butt. The locking occurs as the valve 238 switches to the bypass mode thereof and prevents flow of fluid through fluid lines 231 and 233.

In use, the knife assembly 151 as shown in FIGS. 9 through 14 functions to sever from a succession of pieces of meat each exhibiting a lean portion of constant thickness a portion of a fat layer of variable thickness while leaving a generally constant layer of fat on each of the successive meat pieces. Further, the knife assembly 151 includes a blade locking means to securely lock the knife blade 159 in the desired position while the meat piece is urged past the blade 159 thereby assuring that the blade 159 does not float or move from an initial position relative to the lean-fat juncture of the meat. In doing so, the thickness of the fat remaining on the piece of meat remains consistant along the entire piece.

As best shown by referring to the drawings, the operation of the knife assembly 151 is as follows. When a piece of meat 172 is urged into contact with the gauge plate 157, the gauge plate rear edge 201 is biased upwardly to a position where it rides on the meat top surface 173. When this occurs, the first link 199 is urged upwardly causing the rocker shaft 205 along with the bell cranks 203 and 211 to rotate in a clockwise motion, as shown in FIGS. 11 and 12. When this occurs, the second link 215 is urged to the left, again as shown in FIGS. 11 and 12, causing the gauge plate position indicator support member 217 to also rotate clockwise about pin 219. This moves the first gauge plate indicator 221 into the zone of influence of the first proximity switch 185, which thereby activates the switch 185. This position is shown in solid lines in FIG. 11.

Upon activation of the switch 185, the selector valve 238 is automatically appropriately positioned by suitable circuitry connected to the switch 185 to supply fluid through conduit 233 to the cylinder 227 urging the piston and plunger 229 outwardly with respect thereto. Upon such outward movement of the plunger 229 the elongate leg 183, along with rod 181, is rotated clockwise, as viewed in FIGS. 11 and 12, until the first proximity switch 185 is moved to a position where the first indicator plate 221 is not within the associated zone of influence. This movement of the rod 181 also rotates the blade support members 175 clockwise and positions the blade 159 at a certain position above a plane of the conveyor mechanism 155. By adjusting the length of the second link 215 the vertical difference between the gauge plate rear edge 201 and the knife blade 159 will be adjusted to retain the desired amount of fat portion on the meat pieces 172 for both premium and regular grades.

After the piece of meat 172 has passed the gauge plate 159, the gauge plate rear edge 201 drops urging the first link 199 downwardly, as shown in FIGS. 11 and 12, the second link 215 rightwardly, and the first indicator plate 221 into the zone of influence of the second proximity switch 186. When this occurs the second proximity switch 186 is actuated, resulting in the selector valve 258 being activated to a new position, such that fluid is passed through the first fluid conduit 231 causing the plunger 229 to be retracted within the cylinder 227 and rotating the elongate leg 181 to a position where the second proximity switch 186 is moved an extent such that the first indicator plate 221 is not within its zone of influence.

It can be seen that unless some delay machanism is provided with regard to the activation of the second proximity switch 186, the knife blade 159 will lower prior to the complete passing of the piece of meat therepast. Therefore, a timer means such as a delay timer or relay, incorporated in control panel 92 as discussed before, is incorporated into the electrical circuit connecting the second proximity switch 186 to the selector valve 238 thereby delaying the triggering of the valve 238 for a desired length of time allowing the successive pieces of meat to be completely urged past the knife blade 159 prior to returning the knife blade 159 to a down position as shown in solid lines in FIG. 11.

It is anticipated that a user of the product will want to selectively trim the pieces of meat to leave two different thicknesses of fat layer remaining thereon. By spacing the second indicator plate 223 from the indicator plate support member 217 a distance different from the position of the first indicator plate 221 and by utilizing the third proximity switch 197 along with the second proximity switch 186 the position of the knife blade 159 can be varied a predetermined amount different from that if the switches 185 and 186 are utilized.

It is noted that the switches 185, 186 and 197 have only short travel distances between "on" and "off" in either direction to ensure a close control over the thickness of the meat.

It is to be understood that while certain forms of the present invention have been illustrated and described herein, it is not to be limited to the specific forms or arrangement of parts described and shown.

What is claimed and desired to secure by Letters Patent is:

1. In a meat defatting machine adapted for removing all but a generally consistant thickness of a portion of fat from successive pieces of meat, each having a fat layer of varying thickness thereon and a lean portion of generally consistant thickness; said machine comprising a housing, a conveyor for moving meat therebetween, a defatting knife positioned above the conveyor and moveable through a continuous range of positions thereabove, a gauge plate member engageable with a top surface of each successive piece of meat and means connecting the knife blade to the gauge plate to position the knife blade a desired amount above the conveyor dependent upon the thickness of each successive piece of meat, the improvement comprising:
   (a) a knife blade position locking means cooperating with said knife blade and adapted to lock said knife blade in a predetermined position above a plane associated with said conveyor whereby said knife blade does not move relative to said conveyor as a piece of meat is urged therepast such that a generally consistent thickness of fat layer is left along the piece of meat.

2. A meat defatting machine for severing from a succession of pieces of meat each having a red meat layer of generally consistant thickness and a fat layer of varying thickness, a portion of said fat layer in excess of a desired total thickness of red meat layer and fat layer; said machine comprising:
   (a) a housing;
   (b) a knife blade;
   (c) conveyor means associated with said housing to present a succession of pieces of meat past said knife blade;
   (d) a gauge plate transversely mounted above the conveyor means on a support member, the gauge plate being pivotally mounted to said support member along an axis thereof and a portion of said gauge plate spaced from said axis being movable with respect to said conveyor means and engageable with a top surface of each successive piece of meat urged therepast;
   (e) knife blade support means comprising a member connected to said knife blade and pivotally connected to said housing;
   (f) blade positioning means for selectively positioning said blade at a proper position relative to said conveyor plane; and
   (h) blade locking means to lock said blade in said desired position while cutting an individual piece of meat as said piece of meat is urged therepast.

3. The machine as set forth in claim 2 wherein:
   (a) said knife blade support means includes an elongate leg extending therefrom; and
   (b) said blade positioning means comprises a first portion connected to said gauge plate, a second portion connected to said elongate leg and a ram member extending between said housing and said elongate leg.

4. The machine as set forth in claim 3 wherein:
   (a) said blade positioning means further comprises
      (1) a double acting power ram having a cylinder and a reciprocating plunger, said cylinder being attached to said housing, said plunger having an end attached to said knife blade support means, said ram including hydraulic fluid lines providing fluid to opposite ends of the cylinder so as to motivate said plunger in opposite directions; and
      (2) selector valve means selectively allowing fluid flow to a desired one of said cylinder opposed ends, said selector valve means being selectively positioned to prohibit fluid from flowing from said ram thereby locking said knife blade in position;
   (b) said blade positioning means first portion comprises a gauge plate position indicator connected to said gauge plate and moveable therewith when a piece of meat passes thereunder;
   (c) said blade positioning means second portion comprises first and second proximity locator switches secured to said blade support means elongate leg in alignment with a line of motion of said gauge plate position indicator, said proximity switches each having a zone of influence therearound such that when said gauge plate indicator is biased into one of said zones of influence, the switch associated therewith is activated whereby when said gauge plate indicator is positioned within said first proximity switch field of influence; said first proximity indicator switch activates said valve means to a first position to supply fluid to a first end of said cylinder; when said gauge plate indicator is positioned within said second proximity switch field of influence, said second proximity switch activates said valve means to a second position to supply fluid to a second end of said cylinder; and when said gauge plate indicator is positioned between said first and second proximity switch zone of influence said valve means is positioned to prevent fluid from flowing from said cylinder thereby positively positioning said knife blade a fixed distance above the conveyor means.

5. The machine as set forth in claim 4 including:
   (a) timer means activated when said selector valve is activated to prevent flow from said cylinder whereby after a desired amount of time said valve is opened allowing said knife blade to return to a lowermost position.

6. A floating knife assembly for use with a meat defatting machine having a conveyor means for moving a succession of pieces of meat past a cutting means, the defatting machine adapted to cut a portion of a layer of fat from each of the successive pieces of meat, each piece having a constant thickness of red meat portion and a variable thickness of fat layer, the fat layer having a surface engageable with the conveyor means; said assembly comprising:

(a) a defatting knife blade positioned transverse to said conveyor and adapted to engage each successive piece of meat;

(b) mechanical link means connecting said knife blade to said machine to allow said knife blade to be positioned over a continuous range of positions above said conveyor and fat layer surface; and (c) a gauge member adapted to engage a top surface of each successive piece of said succession of pieces of meat and ride thereon as said pieces of meat are urged therepast by said conveyor means, said gauge member urging said knife blade into one of said continuous range of positions relative to said fat layer surface;

(d) connecting means connecting said gauge member to said knife blade; and (e) locking means cooperating between said gauge member and said knife member through said connecting means to positively position said blade at a fixed distance over said conveyor while a particular piece is being cut by said blade; whereby a generally consistent thickness of fat layer is left remaining attached to the red meat portion of each successive piece of meat.

* * * * *